United States Patent Office 2,887,363
Patented May 19, 1959

2,887,363

CONVERSION OF METHANE TO PRODUCE HYDROGEN SULFIDE

Prentiss S. Viles, Baytown, Tex., assignor, by mesne assignments, to Esso Research and Engineering Company, Elizabeth, N.J., a corporation of Delaware No Drawing. Application September 28, 1956
Serial No. 612,579

4 Claims. (Cl. 23—181)

The present invention is directed to a method for converting methane. More particularly, the invention is directed to the formation of hydrogen sulfide from methane. In its more specific aspects, the invention is concerned with the conversion of sulfur dioxide by reacting same with methane.

The present invention may be briefly described as a method for converting methane in which the methane is admixed with sulfur dioxide, the methane being in stoichiometric excess. The mixture is then contacted with cobalt molybdate at a temperature in excess of 800° F. and at a suitable pressure to form a product which consists essentially of hydrogen sulfide. The hydrogen sulfide is then recovered and suitably may be used for the formation of elementary sulfur.

The temperatures employed in the present invention are suitably in excess of 800° F. and may be in the range from about 800° to about 1600° F.; a preferred temperature range is from about 1100° to about 1300° F.

The catalyst employed in the practice of the present invention is cobalt molybdate preferably on a support. It is to be understood that within the purview of the present invention, cobalt molybdate is a mixture of cobaltous oxide and molybdic trioxide. The cobaltous oxide and molybdic trioxide may be employed in a preferred ratio of mol per mol as the catalyst but the ratio of cobaltous oxide and molybdic trioxide may range from about 0.1:1 to 1.0:1 mol of cobaltous oxide per mol of molybdic trioxide.

The amount of cobalt molybdate on the support may range from about 1 to about 25 percent by weight with a preferred amount of approximately 15 percent by weight of the total catalyst.

The supports for the cobalt molybdate may suitably be alumina, zirconia, magnesia, silica, silica-alumina, Filtrol, kieselguhr, Floridan, and the like. Preferred supports are purified aluminas, such as pure alpha and gamma alumina.

Pressures employed in the practice of the present invention may range from 0 pounds absolute to about 1000 pounds per square inch gauge with a preferred pressure of about atmospheric. Low pressures in the range given are most desirable.

The methane and sulfur dioxide mixture may be contacted with the catalyst at a suitable gas feed rate which may be in the range from about 1 to about 500 volumes of feed per volume of catalyst per hour with a preferred v./v./hour from about 50 to about 100.

The present invention may be practiced in various types of equipment; for example, the reaction zone may have a catalyst bed arranged therein as a fixed bed or the reaction may be conducted in the so-called fluidized powder technique where the cobalt molybdate is suitably suspended in the gaseous mixture of methane and $SO_2$.

The reaction zone employed in the present invention may be constructed of material which provides a non-reactive surface with the product or which forms with the product a surface which does not react further with the product. Thus, with steel or ferrous metal reaction walls and conduits of such nature, the product may react therewith initially to form a non-reactive coating thereon. Preferably, the reaction zone walls and the interior or conduits employed for transporting the product are suitably constructed of non-reactive material such as glass, ceramic ware, and the like or ferrous metal equipment may be lined with such non-reactive material.

In order to illustrate the invention further a run was made wherein a gaseous mixture containing 97% by weight methane and 3% by weight of sulfur dioxide was passed through a glass reactor maintained at a temperature of 1100° F. and at a rate of approximately 10 volumes of gas mixture per hour. The effluent gas from this reaction showed that none of the sulfur dioxide and methane was converted to hydrogen sulfide.

Another run was made under exactly the same conditions excepting that a glass reaction zone was provided in which cobalt molybdate supported on alumina was used as a catalyst bed in the reaction zone. The same gas mixture which was under the same temperatures and under the same flow rates was passed through the bed of catalyst. Analysis of the product effluent gas from this reaction showed that the sulfur dioxide had been converted quantitatively to hydrogen sulfide. Some of the excess methane was converted to hydrogen.

In another operation using the same equipment and the same catalyst, temperatures greater than 800° F., and less than 900° F. were employed. Hydrogen sulfide was found in the reaction products and the reaction was initiated at a temperature in excess of 800° F.

As shown by the examples, it is important to provide a substantial stoichiometric excess of methane to sulfur dioxide in the mixture. By providing a substantial stoichiometric excess, the sulfur dioxide is substantially completely converted to hydrogen sulfide and a small amount of carbon monoxide is obtained. A trace of water may also result and the excess methane may be converted in part to hydrogen.

The present invention is of considerable importance and utility in that sulfur dioxide is available from a large number of industries and exists in considerable quantities in flue gases especially where sulfur-containing hydrocarbons are burned as fuel. The presence of sulfur dioxide in the combustion products, which are usually discarded to the atmosphere, constitutes a considerable nuisance and may contribute to pollution problems. The present invention is important in that the sulfur dioxide, by reaction with the methane over the cobalt molybdate, may be converted to hydrogen sulfide from which elementary sulfur and its products are manufactured by well-known processes, such as the Klaus reaction. Therefore, the present invention is of considerable importance and utility in that atmospheric pollution resulting from combustion of sulfur-containing hydrocarbons may be substantially diminished or entirely eliminated.

Also the present invention has utility in the recovery of sulfur from sulfur-bearing ores, such as pyrites, wherein the pyrites may be burned to form $SO_2$ and a portion of the $SO_2$ converted, according to the present invention, to $H_2S$ which then may be reacted with another portion of the $SO_2$ for the recovery of elemental sulfur. The present invention is, therefore, of considerable importance and utility in the pyrites industry.

The nature and objects of the present invention having been completely described and illustrated, what I wish to claim as new and useful and to secure by Letters Patent is:

1. A method for converting methane which comprises contacting a mixture of methane and sulfur dioxide in which the methane is present in an amount in a substantial stoichiometric excess of the sulphur dioxide at a temperature within the range of about 800° to about 1600° F. with a cobalt molybdate catalyst to form a product consisting essentially of hydrogen sulfide, and recovering said product.

2. A method in accordance with claim 1 in which the catalyst is cobalt molybdate on alumina.

3. A method for converting methane which comprises mixing a substantial stoichiometric excess of methane with sulfur dioxide to form a mixture, contacting the mixture with cobalt molybdate supported on purified alumina at a temperature within the range between 1100° and 1300° F. and at a pressure in the range from about 0 to about 1000 pounds per square inch gauge to form a product consisting essentially of hydrogen sulfide, and recovering said product.

4. A method for converting methane which comprises forming a mixture of 97 percent by weight methane and 3 percent by weight of sulfur dioxide, contacting the mixture with cobalt molybdate supported on alumina at a temperature within the range between 1100° and 1300° F. and at a pressure within the range from about 0 to about 1000 pounds per square inch gauge to form a product consisting essentially of hydrogen sulfide, and recovering said product.

References Cited in the file of this patent

UNITED STATES PATENTS

| | | |
|---|---|---|
| 1,967,264 | Rosenstein | July 24, 1934 |
| 2,398,919 | Byrns | Apr. 23, 1946 |
| 2,772,315 | Hadden | Nov. 27, 1956 |

FOREIGN PATENTS

| | | |
|---|---|---|
| 1,067,415 | France | Jan. 27, 1954 |